Figure 1:
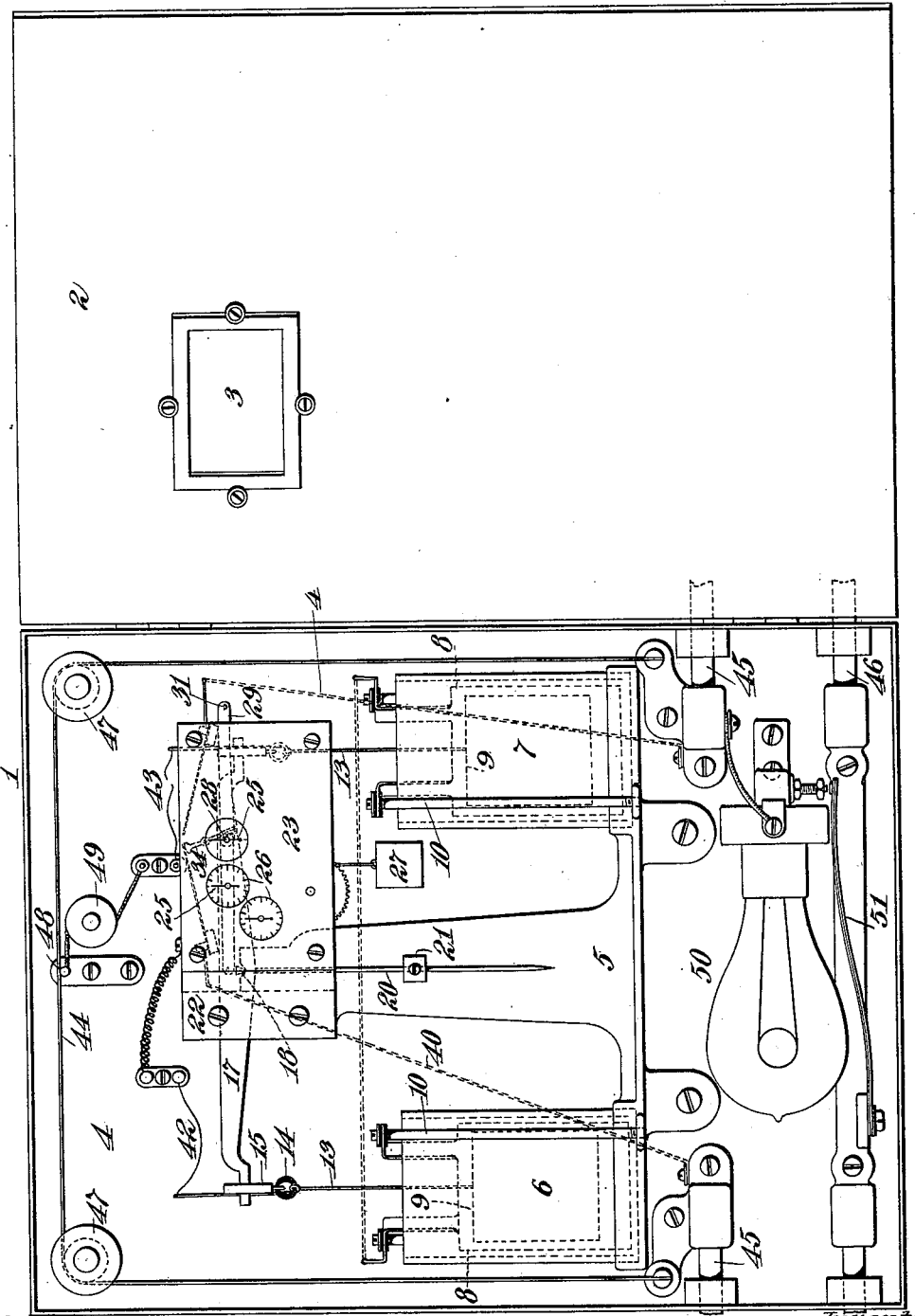

No. 659,389. Patented Oct. 9, 1900.
T. A. EDISON.
ELECTRIC METER.
(Application filed Sept. 24, 1898.)
(No Model.) 3 Sheets—Sheet I.

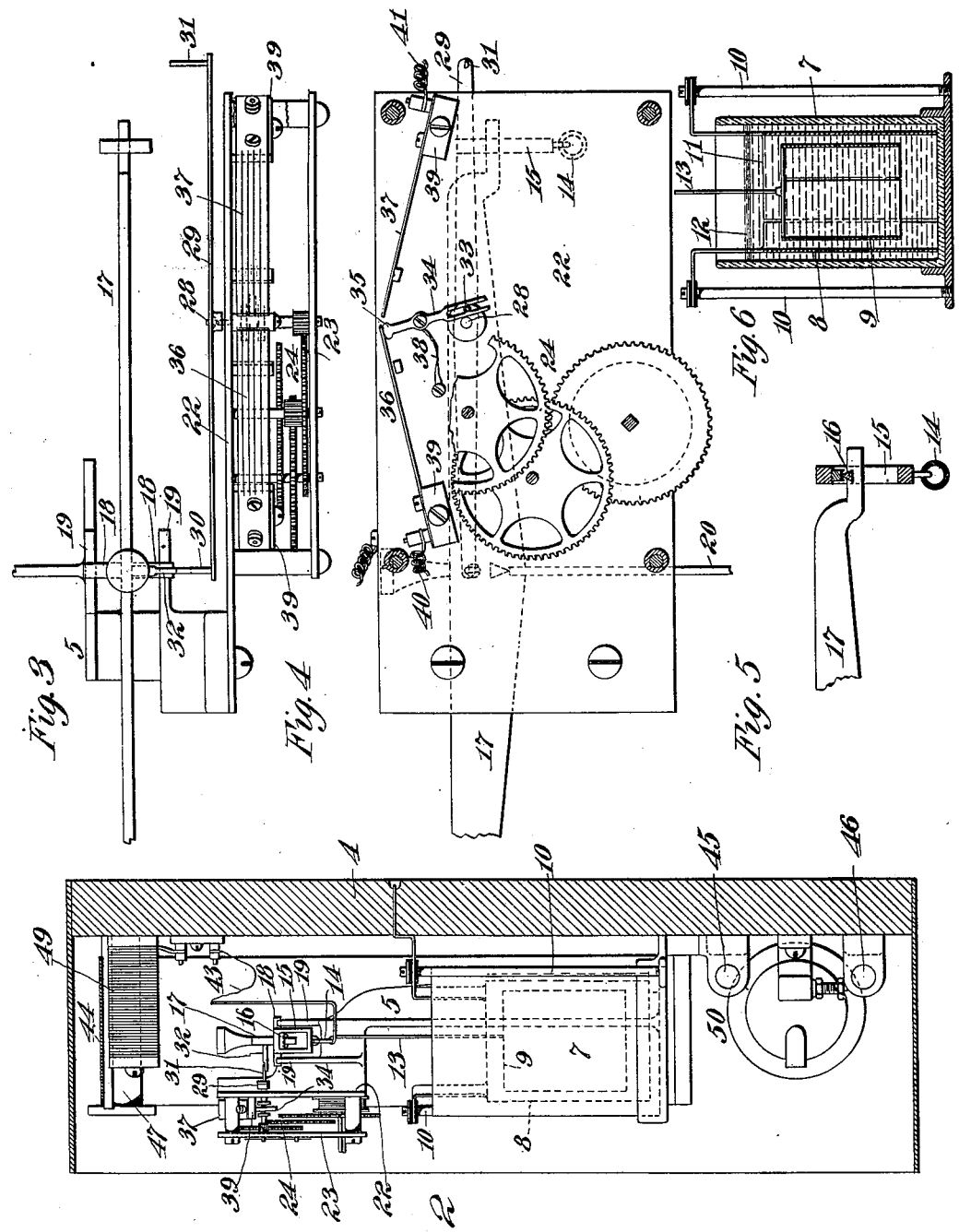

No. 659,389. Patented Oct. 9, 1900.
T. A. EDISON.
ELECTRIC METER.
(Application filed Sept. 24, 1898.)
(No Model.) 3 Sheets—Sheet 3.

Witnesses: Inventor
Thomas A. Edison
by Rich N. Dyer
Atty.

UNITED STATES PATENT OFFICE.

THOMAS A. EDISON, OF LLEWELLYN PARK, NEW JERSEY.

ELECTRIC METER.

SPECIFICATION forming part of Letters Patent No. 659,389, dated October 9, 1900.

Application filed September 24, 1898. Serial No. 691,760. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Electric Meters, (Case No. 1,000,) of which the following is a specification.

My invention relates to various new and useful improvements in electric meters of the type wherein the electrolytic or electrodepositing action of the current in a shunt of small but constant ratio is utilized in the determination of the total current in a consumption-circuit.

My improved meter is accurate in its registration, it is capable of instant and easy reading, it is simple in its construction, it is not liable to derangement, its construction is of such a character that it will not be impaired or injured by the handling to which it may be subjected in transportation or installation, and it may be operated with a minimum current.

Underlying my present invention is an improved electrolytic cell, which can be absolutely standardized and which in a stationary temperature will always maintain a constant resistance, so that the rate of deposition will be uniform. This improved cell is provided with two electrodes, preferably of pure zinc or zinc amalgam, immersed in a solution of sulfate of zinc in distilled water. Other electrodes may be employed, as will be explained. In order to prevent evaporation of the solution and any tendency thereof to creep, and to thereby maintain the absolute uniformity of the solution, I cover the solution with a stable inorganic non-miscible liquid, such as mineral oil, of which paraffin-oil is the preferred example. Having produced an electrolytic cell of this character which will be entirely unaffected by evaporation and which will always be possessed of a uniform rate of deposition, I connect one or two of such cells around a relatively-low resistance, whereby a minute but definite and constant ratio of current will affect the cell or cells, and I obtain by the deposition from one electrode to the other and by positive mechanical devices an accurate registration, capable of easy reading, of the total current. To this end I prefer to attach the movable electrodes of two cells to the two extremities of a scale-beam supported on knife-edges or other relatively frictionless support, the electrical connections being such that while the metal is being deposited upon the movable electrode of one cell it will be stripped off of the movable electrode of the other cell, whereby the scale-beam will tend to move downward toward the heavier movable electrode. If desired, however, a single cell may be employed, connected to one extremity of the scale-beam, a counterweight being connected to the other extremity thereof. The beam is connected with a suitable retarding device, which opposes the stress exerted by either of the movable electrodes of the two cells on which the deposit is taking place. In this way the scale-beam, under the effect of the depositing and stripping of the metal, will partake of an extremely-slow movement in one direction or the other, the extent of such movement being constant, as I shall explain, but its relative slowness depending upon the current influencing the cells. The retarding device which I prefer to use for opposing the movements of the beam is a weight carried on an arm depending from the beam in line with the pivot thereof, which weight may be adjustable vertically, whereby its opposing effect may be adjusted and by means of which, also, the capacity of the meter may be varied. The oscillations of the scale-beam actuate an escapement controlling a registering-train, which operates a suitable pointer or pointers of a dial or dials. The connection between the scale-beam and escapement is of a novel character, which will presently be more fully described, and is such that friction is so infinitely small as to be negligible. The registering-train is driven either by a weight or spring, preferably the former, and since the release of the escapement takes place very infrequently, even when currents of considerable volume are influencing the cell or cells, it will be possible to obtain a sufficient fall of the relatively light weight as to require winding thereof only during long intervals of time. For example, in meters which I have constructed the fall of the weight is approximately two inches in a year, assuming the meter to be carrying its maximum load. In order that the oscillations of the scale-beam may be produced, the current through the cell or cells requires to be reversed at each tripping of the escapement, and I have produced an improved reversing-switch wherein only a single movable contact is required, such reversing-switch being operated directly by the register-train and therefore imposing no stress upon the scale-beam. To prevent oxidation of the parts comprising the current-reversing devices, I plate the contact-surfaces thereof with gold or some other non-oxidizable metal.

The elements of the meter will be preferably carried on a suitable insulated board within any convenient meter-box having preferably a glass front, through which the dials may be observed. When used in localities where low temperatures may be expected, it is desirable to employ a heating device brought into circuit by means of a thermostat if the temperature falls dangerously near the freezing-point of the liquid in the cell. Such a heating device is preferably an incandescent lamp arranged in a branch circuit across the line and in series with a thermostatic bar composed of two metals having unequal coefficients of expansion. In order that changes in temperature, which necessarily affect the resistance of the cell or cells, may not result in incorrect registration, I interpose in series with the cell or cells an ordinary compensating-coil, the resistance of which changes inversely with that of the cell or cells, whereby the resistance of the shunt including the cell or cells and said compensator will be always maintained constant, irrespective of changes in temperature.

In the accompanying drawings I have illustrated the preferred construction of my improved meter; but the details thereof may be obviously varied.

Figure 7:
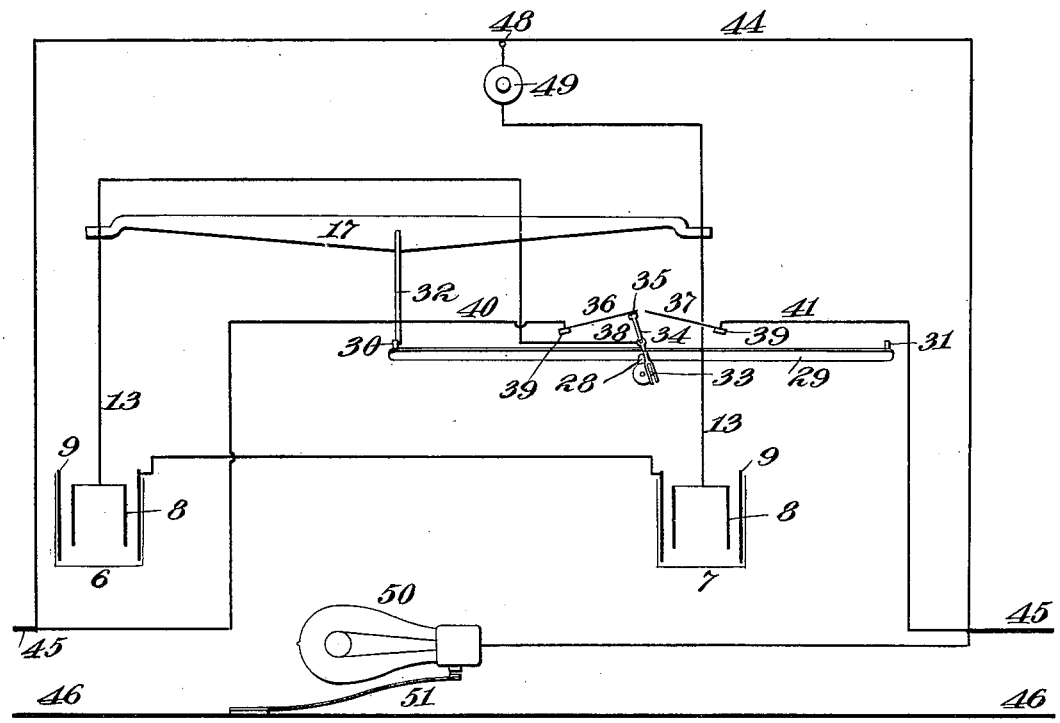
Figure 8:
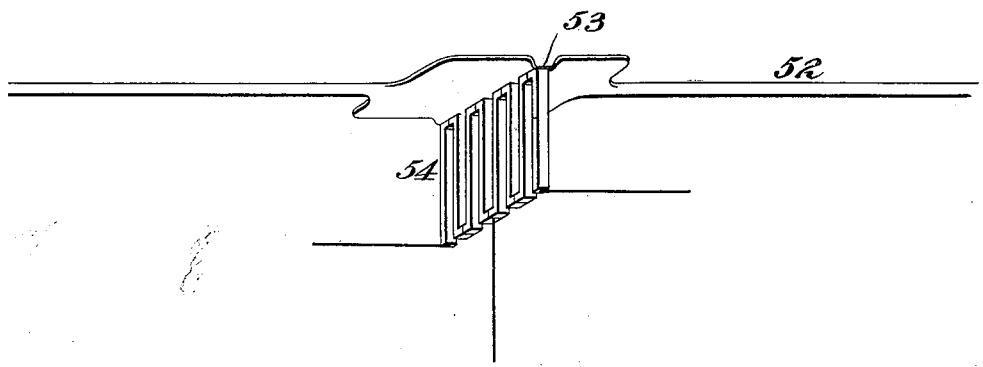

In the drawings, Figure is a front elevation of the meter with the door of the meter-case open. Fig. 2 is a side elevation and partial section of the meter. Fig. 3 is a plan view of the scale-beam and clockwork mechanism of the meter. Fig. 4 is an elevation of the clockwork mechanism. Fig. 5 is a side elevation and partial section at one end of the scale-beam. Fig. 6 is a sectional view of one of the electrolytic cells. Fig. 7 is a diagram showing the electrical connections of the meter, and Fig. 8 is a view illustrating a method of securing a continuous current for operating the meter from an alternating-current circuit.

In all of the above views corresponding parts are represented by the same numerals of reference.

1 is a case having a door 2, provided with a glass-covered opening 3, therein. The parts of the meter are carried by a board 4 or other insulating-backing within the case 1.

5 is a three-armed bracket carrying on two of its arms glass jars 6 7, each of such jars having within it a fixed electrode 8 and a movable electrode 9. These electrodes are preferably cylindrical and open-ended. The fixed electrode 8 is carried by posts 10, from which it is insulated, and by adjustment of the connections between the electrode and these posts the fixed electrode can be accurately centered with relation to the movable electrode and independent of the inclosing glass jar. The glass jars are preferably dipped exteriorly a number of times in acetate of amyl-collodion, the jar being dried after each dipping. This forms a thin tough coating on the outside of the jar, so as to prevent leakage if the jar cracks. The electrodes 8 9 are made preferably of pure metallic zinc, which is amalgamated, and they are immersed in a solution 11 of a salt of the metal, in this instance sulfate of zinc. A solution of from ten to twenty-five per cent. of sulfate of zinc in distilled water gives good results. If desired, the electrodes may be made of any other suitable metal—such, for example, as pure silver immersed in a solution of nitrate of silver, or a solution of cyanid of silver and cyanid of potassium may be used, or the electrodes may be of pure copper immersed in a solution of sulfate of copper, or silver electrodes may be used with a solution giving chlorin by electrolysis, as a solution of hydrochloric acid, whereby instead of the metal being deposited chlorid of silver is formed on one electrode, and when the current is reversed the other electrode is coated with chlorid of silver, while the electrode first chloridized is reduced to metallic silver, no metal being deposited from the solution. The solution 11 is covered with a layer 12 of a stable inorganic non-miscible liquid—such as a mineral oil, of which pure paraffin-oil is the preferred example. A thickness of one-eighth of an inch of this layer will be sufficient. The presence of this layer prevents any evaporation or creeping of the solution, so that the resistance of the solution and its rate of deposition remain always constant.

The movable electrode 9 of each cell is carried by a wire 13 from a ring of ivory or other insulating material 14, hung from a stirrup 15, which in turn is hung by a knife-edge 16 from a scale-beam 17. The scale-beam is carried on knife edges 18 on standards 19. The two movable electrodes being carried by opposite ends of the scale-beam counterbalance each other.

20 is an arm depending from the scale-beam in line with knife-edges 18 and carries on its lower end an adjustable weight 21, which resists the movement of the scale-beam from its central position.

22 and 23 are plates supported by the bracket 5 and carrying a suitable register-train 24. The shafts of the register-train carry indexes 25, which coöperate with dials 26 to register the current. The train is driven by a weight 27 or a suitably-arranged spring. The fast or escapement shaft 28 of the train carries an escapement-arm 29, which is made as long as practicable and has at its ends two pallets 30 and 31, arranged at different distances from the shaft 28. These pallets cöoperate with a pallet-stud 32, carried by the scale-beam above its knife-edge. The scale-beam in oscillating will carry the pallet-stud 32 from beneath one or the other of the pallets and into the path of the other pallet, as will be understood. By making the escapement-arm 29 relatively long the friction between the pallet-stud and pallets is so infinitely small as to be negligible. Furthermore, since the coefficient of friction between the pallet-stud and pallets is always constant there will be no perceptible variation in the friction even if it were measurable. The escapement-shaft 28 carries a crank-pin 33, which works in a fork at the lower end of the pivoted lever 34, which lever carries at its upper end a contact-bar 35, whose contact-surface is preferably gold-plated. This contact-bar 35 is moved by the escapement into and out of contact with springs 36 and 37. These springs approach each other at their free ends, leaving a small gap between, and each movement of the escapement carries the contact-piece from one set of springs to the other. The ends of the springs where they make contact with the contact-piece are also preferably gold-plated.

An electrical connection of definite and uniform resistance is made from the base to the pivoted lever 34 by means of a flexible and non-elastic strip of metal leaf 38. The springs 36 and 37 are mounted upon blocks of insulating material 39 and are connected with wires 40 and 41. Connections of definite and uniform electrical resistance are made with the movable electrodes by means of flexible non-elastic strips of metal foil 42 and 43, which are connected with extensions from the wires 13, which support the movable electrodes. In this way the circuits through the meter have a definite electrical resistance at all times, no circuit connection being carried through a movable joint or being dependent upon surface-contact, except in the case of the reverser. The wires 13, which support the movable electrodes, are coated, as are the glass jars 6 and 7, with a number of layers of acetate of amyl-collodion from the point of their connection with the movable electrodes to a point above the surface of the liquid, so as to insulate them and prevent any electrolytic action upon these wires or at their connections with the electrodes.

The meter, with a current-reverser such as I have described, will be connected around a resistance 44, made preferably of German silver. This resistance is connected in the circuit of one of the main conductors 45 of the circuit whose current is to be measured, such main conductor being broken within the meter and the resistance being located in the break. The other main conductor 46 passes directly through the meter. The resistance 44 may be arranged in flat form around the inside of the case over spools 47. The two ends of the resistance are connected with the ends of the break in the main 45, while from the center of the resistance a connection 48 is made with the resistance, which leads through a temperature-compensating spool 49 to a connection with the movable electrode of one of the cells. An incandescent lamp 50 is arranged in a branch circuit between the two main conductors, and its circuit is controlled by a thermostat 51, which closes the circuit to the lamp when the temperature approaches the freezing-point of the solution, thus preventing the freezing of the solution.

Referring to Fig. 7, in which the electrical connections are illustrated, it will be seen that the two electrolytic cells are connected in series around one half of the resistance 44 or the other half of the resistance 44, according to the position of the current-reversing contact 35, and this arrangement enables me to use a current-reverser with only one contact-point in operation at any time and which reverses the current by a simple movement from one contact-point to another contact-point. While I prefer to use this simple current-reverser, it is evident that the other features of my meter might be used with other forms of current-reverser. It will be observed that when the current passes through the electrolytic cells, the scale-beam being tipped in one direction, the elevated movable electrode will have metal deposited upon it or will become heavier, while the depressed movable electrode will have metal stripped from it or becomes lighter. This process continues until the elevated electrode overbalances the depressed electrode sufficiently to disengage the pallet-stud 32 from the pallet 30 or 31 which is in contact with it, when the escapement will be released and the current will be reversed through the meter. This reversal of current will produce the reverse operation, and the scale-beam will move in the opposite direction. These movements are registered on the dials and correspond with uniform current values. If desired, it will be obvious that only a single cell may be employed, connected to one end of the scale-beam, the movable electrode thereof being counterbalanced by a counterweight connected to the other end of the scale-beam. In this case the current will be reversed by the current-reverser through the single cell, the deposit first taking place upon the movable electrode of the cell to overbalance the counterweight and upon the reversal of the current the metal stripping off of such movable electrode to allow the scale-beam to be tilted by the counterweight. I prefer, however, to use two electrolytic cells, as I have explained.

When it is desired to utilize my improved meter for measuring alternating currents, I prefer to generate by means of such alternating currents a direct current proportional to the alternating current, and which direct current will be used to effect the action in the electrolytic cells. This principle is illustrated in Fig. 8, in which 52 represents one of the main conductors of a circuit which is reduced in cross-section, so as to generate heat at the point 53, which heat is utilized to raise the temperature of the alternate junctions of a thermopile 54, from the center and ends of which are taken wires for conveying a continuous current through the meter.

I do not herein claim the use of a thermopile or equivalent device for generating, by means of an alternating current, a small but relatively-direct current which is to be measured by an electric meter, since that invention is described and claimed in my application filed on even date herewith.

Having now described my invention, what I claim as new, and desire to secure by Letters Patent, is as follows:

1. In an electric meter, the combination with a balanced scale-beam, a retarding device for resisting the oscillations of said beam, and an electrolytic cell the movable electrode of which is connected to said scale-beam, of a register-train, and an escapement operated thereby and controlled by the oscillation of said scale-beam, substantially as set forth.

2. In an electric meter, the combination with a balanced scale-beam, a weighted depending arm carried by said scale-beam for resisting the oscillations thereof, and an electrolytic cell the movable electrode of which is connected to said scale-beam, of a register-train, and an escapement operated thereby and controlled by the oscillation of said scale-beam, substantially as set forth.

3. In an improved electric meter, the combination with a balanced scale-beam, an arm depending from said scale-beam, an adjustable weight on said arm, and an electrolytic cell the movable electrode of which is connected to said scale-beam, of a register-train, and an escapement operated thereby and controlled by the oscillation of said scale-beam, substantially as set forth.

4. In an electric meter, the combination with a balanced scale-beam, a retarding device for resisting the oscillations of said beam, and an electrolytic cell, the movable electrode of which is connected to said scale-beam, of a register-train, an escapement operated thereby and controlled by the oscillations of said scale-beam, and a current-reverser operated by said register-train for reversing the current through the electrolytic cell at each oscillation of the beam, substantially as set forth.

5. In an improved electric meter, the combination with a balanced scale-beam, a weighted arm depending from said beam for resisting the oscillations thereof, and an electrolytic cell the movable electrode of which is connected with said scale-beam, of a register-train, an escapement operated thereby and controlled by the oscillations of said scale-beam and a current-reverser operated by said train for reversing the current through the electrolytic cell, substantially as set forth.

6. In an improved electric meter, the combination with a balanced scale-beam, a retarding device for resisting the oscillations thereof and an electrolytic cell the movable electrode of which is connected to said scale-beam, of a register-train, an escapement-arm driven by said train, two pallets carried by said arm at varying distances from the center of rotation thereof, and a pallet-stud on the scale-beam coöperating successively with said pallets, substantially as set forth.

7. In an improved electric meter, the combination with a balanced scale-beam, a retarding device for resisting the oscillations thereof and an electrolytic cell the movable electrode of which is connected to said scale-beam, of a register-train, a relatively-long escapement-arm driven by said train, two pallets carried by said arm at varying distances from the center of rotation thereof, and a pallet-stud on the scale-beam above the pivot thereof, and coöperating successively with said pallets, substantially as set forth.

8. In an electric meter, the combination with a scale-beam mounted on a knife-edge, a weighted arm depending from said scale-beam vertically beneath the pivot, and an electrolytic cell the movable electrode of which is connected to said scale-beam, of a register-train, an elongated escapement-arm driven by said train, two pallets carried by the extremities of said arms at different distances from the center of rotation thereof, a pallet-stud on the scale-beam in line above its pivot, and a current-reverser operated by the register-train for reversing the current through the electrolytic cell, substantially as set forth.

9. An electrolytic registering-meter having a scale-beam operated by electrolytic action, a power-driven escapement controlled by the scale-beam, and a current-reverser and register operated by said power-escapement, substantially as set forth.

10. In a registering electrolytic meter, the combination with a resistance, of the two-point current-reverser operating to shunt the meter first around one half of the resistance and then around the other half, substantially as set forth.

11. In an electric meter, the combination with a balanced scale-beam, and an electrolytic cell the movable electrode of which is connected to said scale-beam, of a register-train, an escapement operated thereby and controlled by the oscillation of said scale-beam, the movable contact of a current-reverser operated by the register-train at each movement of the escapement, and the two stationary contacts with which the movable contact successively engages for reversing the current through said electrolytic cell, substantially as set forth.

12. In an electric meter, the combination with a balanced scale-beam, and two electrolytic cells the movable electrodes of which are connected to the extremities of said scale-beam, of a register-train, an escapement operated thereby and controlled by the oscillation of said scale-beam, a movable contact operated by the register-train at each movement of the escapement, two fixed contacts with each of which the said movable contact successively engages, a divided resistance shunting both cells, and a connection between the center of such resistance and the movable contact, whereby current will be successively reversed through both cells, substantially as set forth.

13. A registering electrolytic meter having two cells whose movable electrodes are carried by the opposite ends of a scale-beam, such movable electrodes being insulated from the scale-beam and having permanent connections with the circuit through flexible metallic connections, substantially as set forth.

14. In an improved electrolytic cell, the combination of the jar, the fixed electrode therein, and the clamping-rods for adjustably maintaining said fixed electrode in place, substantially as set forth.

15. In a registering electrolytic meter, the combination with the registering mechanism of an electrolytic device for obtaining movement of such registering mechanism, and a current-reverser for reversing the current in the electrolytic device and comprising two fixed contacts and a movable contact successively engaging such fixed contacts, the engaging surfaces of the contacts being gold-plated, for the purpose substantially as described.

This specification signed and witnessed this 19th day of September, 1898.

THOMAS A. EDISON.

Witnesses:
J. F. RANDOLPH,
JNO. R. TAYLOR.